United States Patent [19]

Ona et al.

[11] Patent Number: 4,684,709

[45] Date of Patent: Aug. 4, 1987

[54] ORGANOPOLYSILOXANE COMPOUNDS COMPRISING EPOXY-TERMINATED POLYOXYALKYLENE RADICALS

[75] Inventors: Isao Ona; Masaru Ozaki; Tadashi Fujii, all of Chiba, Japan

[73] Assignee: Toray Silicone Co., Ltd., Tokyo, Japan

[21] Appl. No.: 833,939

[22] Filed: Feb. 25, 1986

[30] Foreign Application Priority Data

Feb. 28, 1985 [JP] Japan .................................. 60-40168

[51] Int. Cl.$^4$ ............................................ C08G 77/06
[52] U.S. Cl. ........................................ 528/15; 528/27; 528/31; 556/445; 556/457; 556/458; 556/479
[58] Field of Search ............................ 528/27, 31, 15; 556/445, 457, 458, 479

[56] References Cited

U.S. PATENT DOCUMENTS 4,208,503  6/1980  Martin ................................. 528/27
4,490,416 12/1984  Westall et al. ...................... 427/387

FOREIGN PATENT DOCUMENTS 0157218 10/1985  European Pat. Off. ............ 556/445

Primary Examiner—Melvyn I. Marquis
Attorney, Agent, or Firm—George A. Grindahl

[57]    ABSTRACT

Organopolysiloxane compounds containing at least one silicon-bonded, epoxy-terminated polyoxyalkylene group are useful for treating materials to provide hydrophilicity for the materials.

6 Claims, 10 Drawing Figures

ORGANOPOLYSILOXANE COMPOUNDS COMPRISING EPOXY-TERMINATED POLYOXYALKYLENE RADICALS

BACKGROUND OF THE INVENTION

The present invention describes novel organopolysiloxane compounds. More specifically, the present invention describes novel organopolysiloxane compounds wherein each molecule has at least 1 silicon-bonded polyoxyalkylene group having a terminal epoxy group.

Organopolysiloxanes have an extremely wide range of properties, such as those of an oil, rubber or solid resin, depending on the composition, size and form of the basic structure, on the type of side chains in the basic structure, on the molecular weight, etc. They are used in a number of diverse industrial fields such as textiles, release paper, electrical fields, electronics, construction and paint additives, etc., due to their characteristic heat resistance, cold resistance, oxidation stability, weather resistance, lubrication, water repellency and insulation.

Organopolysiloxanes with polyoxyalkylene or epoxy groups in each molecule are well known from Japanes Patents Nos. 53-8360 [78-8360] and 51-33839 [76-33839]. In addition, organopolysiloxanes with both polyoxyalkylene and epoxy groups in each molecule are also well known from Japanese Kokai [Laid Open] Pat. No. 49-75897 [74-75897].

However, organopolysiloxanes are heretofore unknown which contain in each molecule a polyoxyalkylene group with a terminal epoxy group.

BRIEF SUMMARY OF THE INVENTION

The goal of the present invention is to provide novel, useful organopolysiloxane compounds wherein each molecule contains at least 1 polyoxyalkylene group with a terminal epoxy group. This goal is accomplished by organopolysiloxane compounds having the formula $AR_2SiO(R_2SiO)_x((RQSiO)_ySiR_2A$ wherein R is a monovalent hydrocarbon or halogenated hydrocarbon group having from 1 to 10 carbon atoms, A is R or Q, Q is a group with the formula

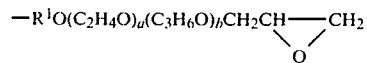

$R^1$ is an alkylene group having from 3 to 5 carbon atoms, a has an average value of 0 to 30, b has an average value of 0 to 30, a+b has an average value of 2 to 60, x has an average value of 1 to 500 and y has an average value of 0 to 100 and containing at least 1 Q group in each molecule.

DETAILED DESCRIPTION OF THE INVENTION

Figure 1:
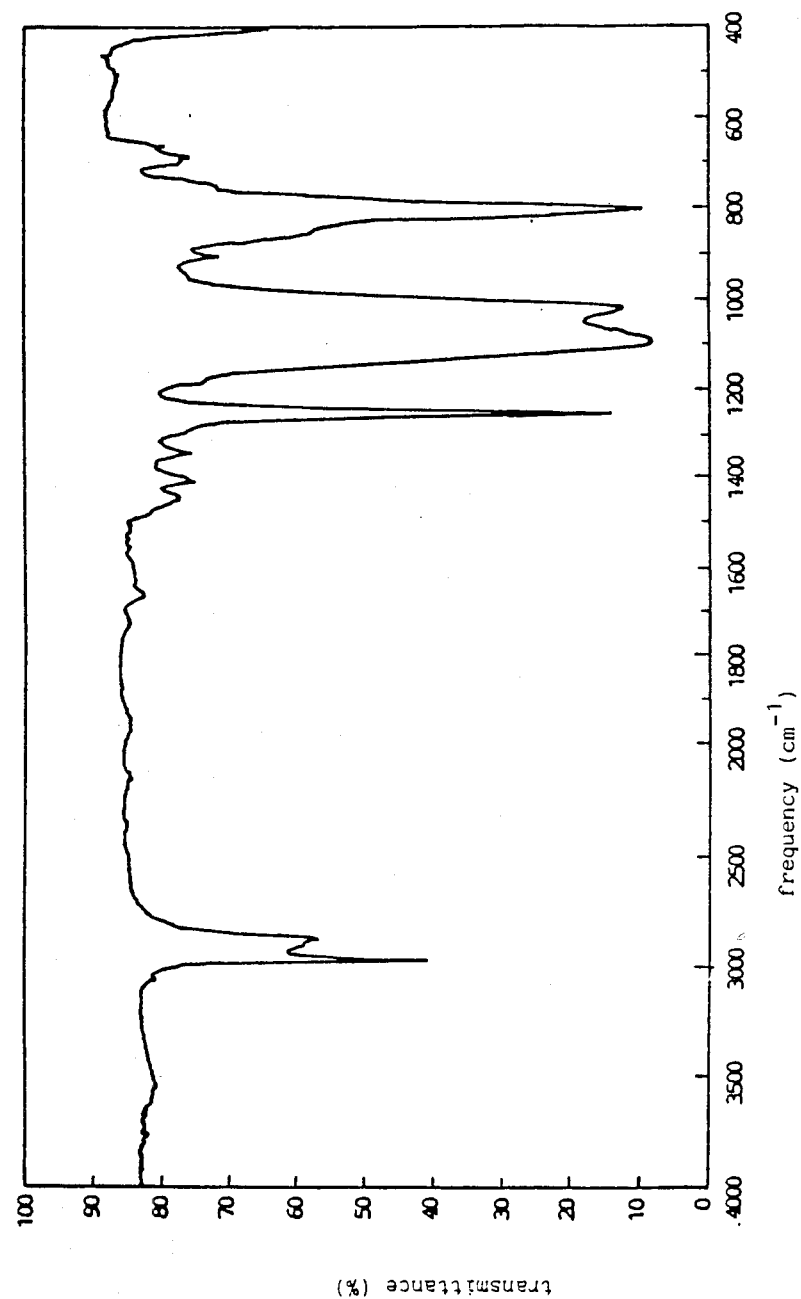

By way of explanation, in the preceding formulas, R is a $C_1$ to $C_{10}$ monovalent hydrocarbon or halogenated hydrocarbon group and concrete examples thereof are alkyl groups such as methyl, ethyl, propyl and octyl; aralkyl groups such as 2-phenylethyl and 2-phenylpropyl; aryl groups such as phenyl and tolyl and halogenated derivatives thereof such as 3,3,3-trifluoropropyl. The R groups within a single molecule may be identical or different.

Herein $R^1$ is a $C_3$ to $C_5$ alkylene group and concrete examples thereof are $-CH_2CH_2CH_2-$, $-CH(CH_3)CH_2-$, $-(CH_2)_4-$, $-CH_2CH(CH_3)CH_2-$, $-(CH_2)_5-$ and $-CH_2C(CH_3)_2-$. The $R^1$ groups within a single molecule may be identical or different.

The Q group has the formula

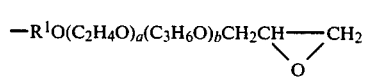

This group provides the organopolysiloxane compounds of the present invention with the reactivity of the epoxy group, which is reactive with various substrates and various resins, and with the hydrophilicity, antistaticity, miscibility with organic resins and paintability of the polyoxyalkylene group.

In Q a has an average value of from 0 to 30, b has an average value of from 0 to 30 and a+b has an average value of from 2 to 60.

The endgroups (A) are R and/or Q the A groups may be identical or different. However, at least 1 Q group must be present in each molecule.

Said organopolysiloxanes are novel compounds which are heretofore unreported in the literature and concrete examples thereof are

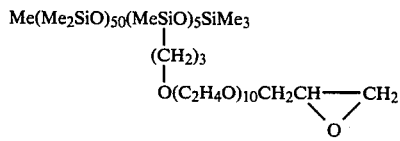

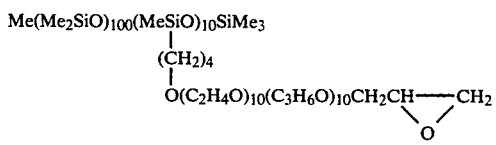

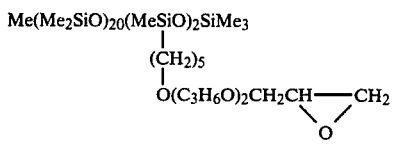

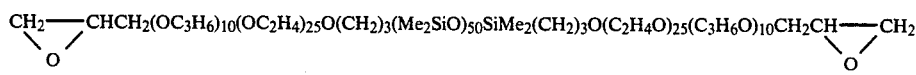

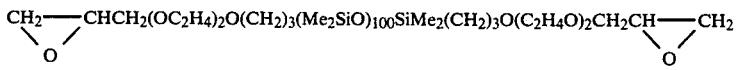

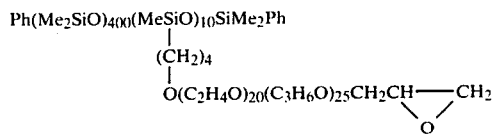

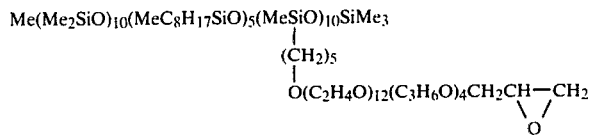
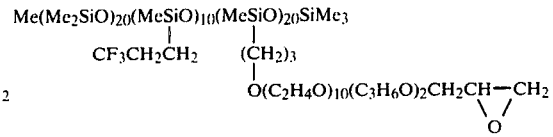

The synthesis of the organopolysiloxane compounds of the present invention is exemplified in the following, well-known synthesis routes.

For the case of A=R, the organopolysiloxane of the present invention is synthesized, for example, by the addition reaction of an organohydrogenpolysiloxane with the general formula $R_3SiO(R_2SiO)_ySiR_3$, wherein R, x and y are all defined as above, with a polyoxyalkylene containing alkenyl and epoxy groups with the general formula

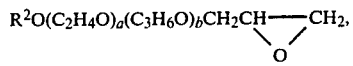

wherein R, a and b are all defined as above, and $R^2$ is a $C_3$ to $C_5$ alkenyl group, in the presence of a platinum-type catalyst such as chloroplatinic acid.

The polyoxyalkylene with a terminal epoxy and a terminal alkenyl group can be produced by, for example, the addition reaction of an alkenyl alcohol with the general formula $R^2OH$, wherein $R^2$ is defined as above, with a moles ethylene oxide and b moles propylene oxide to produce an alkenyl group-containing polyoxyalkylene with the general formula $R^2(C_2H_4O)_a(C_3H_6O)_bH$ wherein $R^2$, a and b are all defined as above, which is then reacted with epichlorohydrin with dehydrochlorination. Polyoxyalkylene with a terminal epoxy group and a terminal alkenyl group and with the general formula

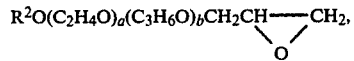

is thus produced.

For the case of A=Q, the organopolysiloxane compound of the present invention may be synthesized, for example, by the addition reaction of an organohydrogensiloxane with the general formula $HR_2SiO(R_2SiO)_xSiR_2H$ wherein R and x are defined as above, or an organohydrogenpolysiloxane with the general formula $HR_2SiO(R_2SiO)_x(RHSiO)_ySiR_2H$ with the above-mentioned polyoxyalkylene with a terminal epoxy group and a terminal alkenyl group in the presence of a platinum-type catalyst such as chloroplatinic acid.

The above-mentioned organohydrogenpolysiloxanes may be synthesized by the polymerization of suitable quantities of organodisiloxane with the general formula $R_3SiOSiR_3$, organohydrogendisiloxane with the general formula $HR_2SiOSiR_2H$, cyclic organohydrogenpolysiloxane with the general formula $$\left[ \begin{array}{c} R \\ | \\ [SiO]_n \\ | \\ H \end{array} \right]$$

and cyclic organopolysiloxane with the general formula $$\left[ \begin{array}{c} R \\ | \\ [SiO]_n \\ | \\ R \end{array} \right]$$

wherein n is an integer of 3 to 10, in the presence of an acid catalyst such as sulfuric acid, nitric acid, trifluoromethanesulfonic acid or activated clay.

The organopolysiloxanes of the present invention are novel compounds which contain a polyoxyalkylene group with a terminal epoxy group. They have the reactivity of the epoxy group and the hydrophilicity, antistaticity, miscibility with organic resins and paintability of the polyoxyalkylene group.

Due to this, the organopolysiloxanes of the present invention are appropriately employed as treatment agents for solids such as various fibers and their knits and weaves; sheet materials such as paper, natural and synthetic leathers, cellophane and plastic films; foams such as synthetic resin foams; synthetic resin moldings; natural and synthetic rubber moldings; metal moldings; glass moldings; and powdery materials such as inorganic powders and synthetic resin powders. They are also appropriately employed as additives to various resins and rubbers such as organic resins, organic rubbers, organic elastomers as well as organopolysiloxane resins, organopolysiloxane rubbers and organopolysiloxane elastomers.

The present invention will be illustrated, but not limited, using examples of execution. "Parts" in the examples means "weight parts" and the viscosity and refractive index are the values measured at 25° C. Me means methyl. Ph means phenyl. cS means centistokes.

EXAMPLE 1

Ten and five-tenths part hexamethyldisiloxane, 262.5 parts cyclic dimethylpolysiloxane tetramer, 27.0 parts trimethylsilyl-terminated methylhydrogenpolysiloxane with a viscosity of 21 cS and 3 parts of an adequately dried activated clay as the polymerization catalyst are all charged to a three-neck flask equipped with a stirrer, reflux condenser and thermometer and polymerized at 70° C. for 8 hours and then filtered with a filtering aid to obtain a trimethylsilyl-terminated dimethylsiloxane-methylhydrogensiloxane copolymer with a viscosity of 60 cS and with the formula $Me_3SiO(Me_2SiO)_{55}(MeHSiO)_7SiMe_3$.

Sixty-seven and four-tenths parts of this trimethylsilyl-terminated dimethylsiloxane-methylhydrogensiloxane copolymer, 32.6 parts of a polyoxyalkylene with a terminal allyl group and a terminal epoxy group and with the formula

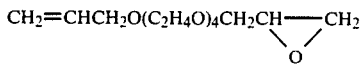

and 25 parts toluene are all charged to a three-neck flask equipped with a stirrer, reflux condenser and thermometer and heated to 85° C. One-tenth part of 3 weight percent isopropanolic chloroplatinic acid is then added and this is then reacted at 120° C. for 3 hours. The toluene and low volatiles are stripped at 140° C./20 mm Hg to obtain an oil with a viscosity of 440 cS, a refractive index of 1.4323 and an epoxy group content of 4.3 weight percent.

The product is confirmed to be an organopolysiloxane with the formula

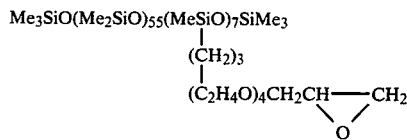

according to infrared absorption spectral analysis (Spectrum 1), nuclear magnetic resonance spectral analysis (Spectrum 2) and the above-mentioned analytic results.

EXAMPLE 2

Sixty-seven and two-tenths parts tetramethyldisiloxane, 742 parts cyclic dimethylpolysiloxane tetramer, 60.1 parts cyclic methylhydrogenpolysiloxane and 10 parts of an adequately dried activated clay as the polymerization catalyst are all charged to a three-neck flask equipped with a stirrer, reflux condenser and thermometer, polymerized at 55° C. for 10 hours and then filtered with a filtering aid to obtain a dimethylhydrogensilyl-terminated dimethylsiloxane-methylhydrogensiloxane copolymer with a viscosity of 13 cS and with the formula $HMe_2SiO(Me_2SiO)_{20}(MeHSiO)_2SiMe_2H$.

Forty-one and six-tenths parts of this dimethylhydrogensilyl-terminated dimethylsiloxane-methylhydrogensiloxane copolymer, 58.4 parts of a polyoxyalkylene with a terminal allyl group and a terminal epoxy group and with the formula

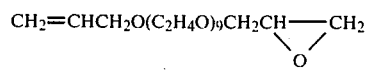

and 20 parts toluene are all charged to a three-neck flask equipped with a stirrer, reflux condenser and thermometer, heated at 110° C., 0.1 part of 3 weight percent isopropanolic chloroplatinic acid is added and this is then reacted at 120° C. for 2 hours. The toluene and low volatiles are stripped at 140° C./20 mm Hg to obtain an oil with a viscosity of 600 cS, a refractive index of 1.4470 and an epoxy group content of 5.1 weight percent. The product is confirmed to be an organopolysiloxane with the formula

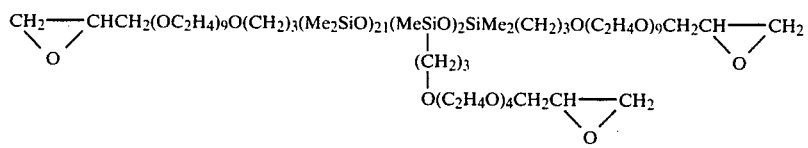

according to infrared absorption spectral analysis (Spectrum 3), nuclear magnetic resonance spectral analysis (Spectrum 4) and the preceding analytic results.

EXAMPLE 3

Eleven and four-tenths parts tetramethyldisiloxane, 88.6 parts cyclic dimethylpolysiloxane tetramer and 3 parts adequately dried activated clay as the polymerization catalyst were all charged to a three-neck flask equipped with a stirrer, reflux condenser and a thermometer, polymerized at 55° C. for 10 hours and then filtered with a filtering aid to obtain dimethylhydrogensilyl-terminated dimethylpolysiloxane with a viscosity of 9 cS and with the formula $HMe_2SiO(Me_2SiO)_{14}SiMe_2H$.

Forty-eight and nine-tenths parts of this dimethylhydrogensilyl-terminated dimethylpolysiloxane, 51.1 parts of a polyoxyalkylene with a terminal allyl group and a terminal epoxy group and with the formula $CH_2=CHCH_2O(C_2H_4O)_9CH_2CH\underset{O}{\overset{}{\diagdown\diagup}}CH_2$ and 30 parts toluene are all charged to a three-neck flask equipped with a stirrer, reflux condenser and a thermometer, heated to 80° C., 0.1 part 3 weight percent isopropanolic chloroplatinic acid is added and this is then reacted at 110° C. for 2 hours. The toluene and low volatiles are stripped at 140° C./20 mm Hg to provide an oil with a viscosity of 255 cS, a refractive index of 1.4410 and an epoxy group content of 3.9 weight percent.

The product is confirmed to be an organopolysiloxane with the formula

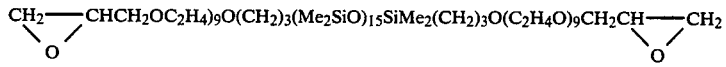

according to infrared absorption spectral analysis (Spectrum 5), nuclear magnetic resonance spectral analysis (Spectrum 6) and the analytic results above.

EXAMPLE 4

Sixty-nine and six-tenths of the same trimethylsilyl-terminated dimethylsiloxane-methylhydrogensiloxane copolymer as in example 1, 30.4 parts of a polyoxyalkylene with a terminal allyl group and a terminal epoxy group and with the formula

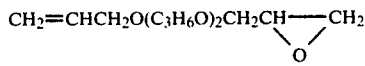
$CH_2=CHCH_2O(C_3H_6O)_2CH_2CH{-}CH_2$
                                    \ /
                                     O and 25 parts toluene are all charged to a three-neck flask equipped with a stirrer, reflux condenser and a thermometer, heated to 85° C., 0.1 part 3 weight percent isopropanolic chloroplatinic acid is added and this is then reacted at 120° C. for 3 hours. The toluene and low volatiles are stripped at 140° C./20 mm Hg.

The resulting liquid has a viscosity of 170 cS, a refractive index of 1.4170 and an epoxy group content of 4.3 weight percent and is confirmed to be an organopolysiloxane with the formula

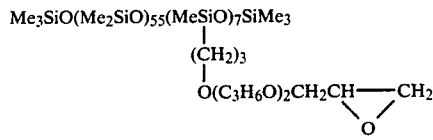

$Me_3SiO(Me_2SiO)_{55}(MeSiO)_7SiMe_3$
                  |
                  $(CH_2)_3$
                  |
                  $O(C_3H_6O)_2CH_2CH{-}CH_2$
                                        \ /
                                         O according to infrared absorption spectral analysis (Spectrum 7) and nuclear magnetic resonance spectral analysis (Spectrum 8).

EXAMPLE 5

Twenty-five and two-tenths parts of a trimethylsilyl-terminated dimethylsiloxane-methylhydrogensiloxane copolymer with the formula $Me_3SiO(Me_2SiO)_{130}(MeHSiO)_{10}SiMe_3$, 74.8 parts of a polyoxyalkylene with a terminal allyl group and a terminal epoxy group and with the formula

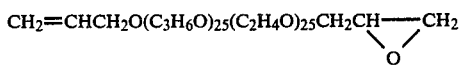
$CH_2=CHCH_2O(C_3H_6O)_{25}(C_2H_4O)_{25}CH_2CH{-}CH_2$
                                                \ /
                                                 O and 25 parts toluene are all charged to a three-neck flask equipped with a stirrer, reflux condenser and a thermometer, heated to 85° C., 0.1 part 3 weight percent isopropanolic chloroplatinic acid is added and this is then reacted at 120° C. for 3 hours. The toluene and low volatiles are stripped at 140° C./20 mm Hg to obtain a liquid with a viscosity of 3500 cS, a refractive index of 1.4408 and an epoxy group content of 1.2 weight percent. This is confirmed to be an organopolysiloxane with the formula

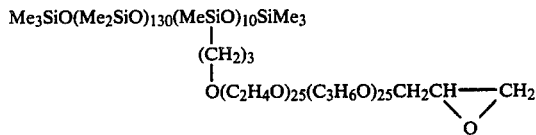

$Me_3SiO(Me_2SiO)_{130}(MeSiO)_{10}SiMe_3$
                  |
                  $(CH_2)_3$
                  |
                  $O(C_2H_4O)_{25}(C_3H_6O)_{25}CH_2CH{-}CH_2$
                                                      \ /
                                                       O according to infrared absorption spectral analysis (Spectrum 9), nuclear magnetic resonance spectral analysis (Spectrum 10) and the above-mentioned analytic results.

EXAMPLE 6

Sixty-eight and five-tenths parts of an organopolysiloxane with the formula

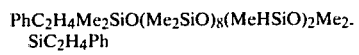
$PhC_2H_4Me_2SiO(Me_2SiO)_8(MeHSiO)_2Me_2SiC_2H_4Ph$ 31.5 parts of polyoxyalkylene with a terminal allyl group and a terminal epoxy group and with the formula

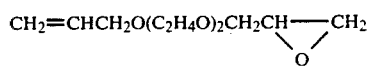
$CH_2=CHCH_2O(C_2H_4O)_2CH_2CH{-}CH_2$
                                    \ /
                                     O and 25 parts toluene are all charged to a three-neck flask equipped with a stirrer, a reflux condenser and a thermometer, heated to 85° C., 0.1 part 3 weight percent isopropanolic chloroplatinic acid is added and this is then reacted at 120° C. for 3 hours. The toluene and low volatiles are stripped at 140° C./20 mm Hg to obtain a liquid with a viscosity of 80 cS, a refractive index of 1.4495 and an epoxy group content of 5.8 weight percent. This is confirmed to be an organopolysiloxane with the formula

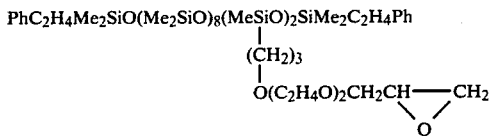

$PhC_2H_4Me_2SiO(Me_2SiO)_8(MeSiO)_2SiMe_2C_2H_4Ph$
                         |
                         $(CH_2)_3$
                         |
                         $O(C_2H_4O)_2CH_2CH{-}CH_2$
                                             \ /
                                              O according to infrared absorption spectral analysis, nuclear magnetic resonance spectral analysis and the above-mentioned analytic results.

SIMPLE EXPLANATION OF THE FIGURES

Figure 3:
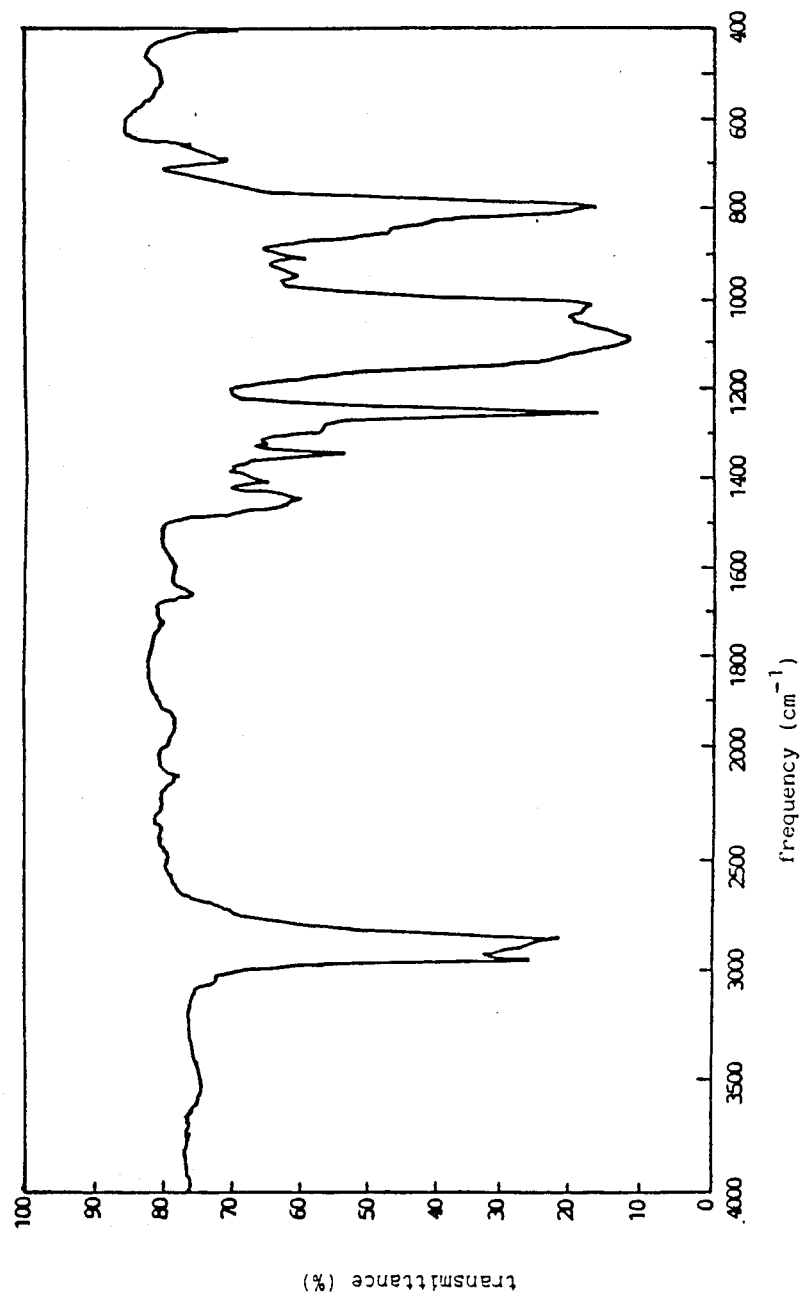
Figure 5:
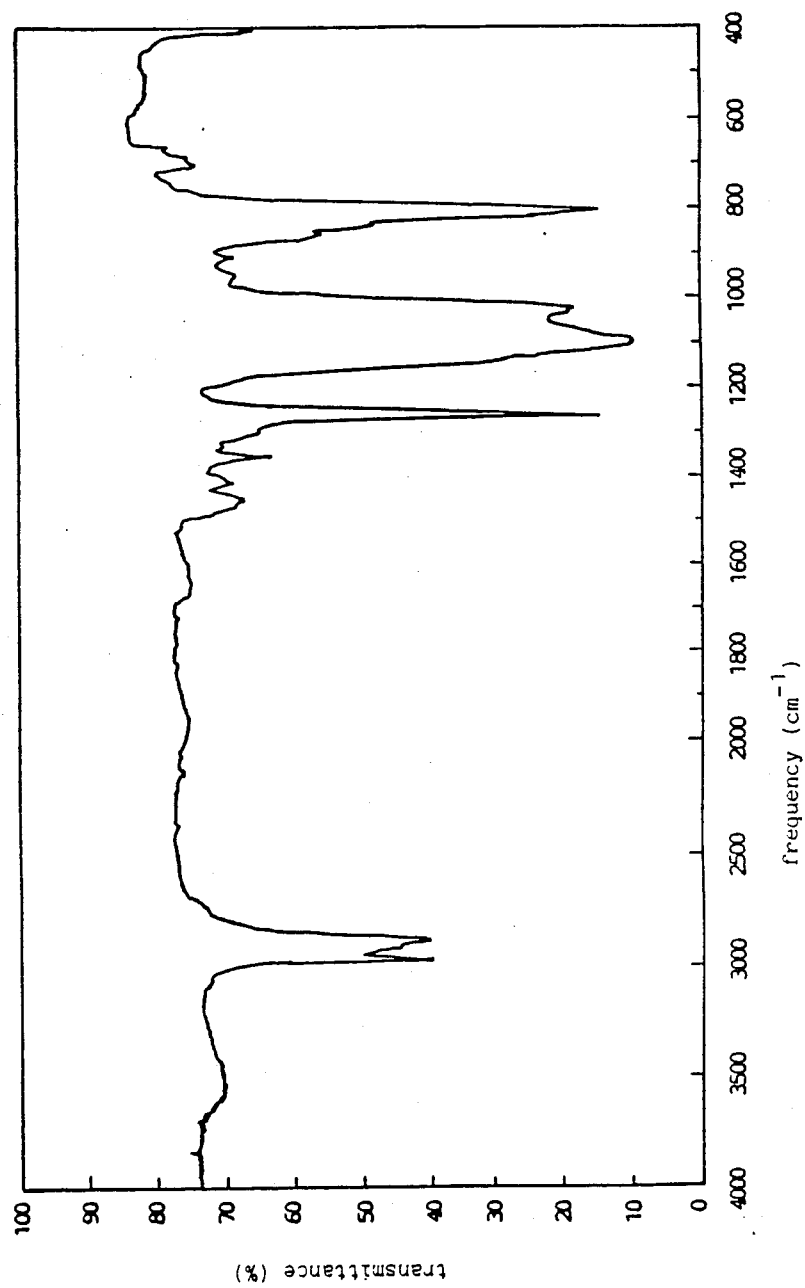
Figure 7:
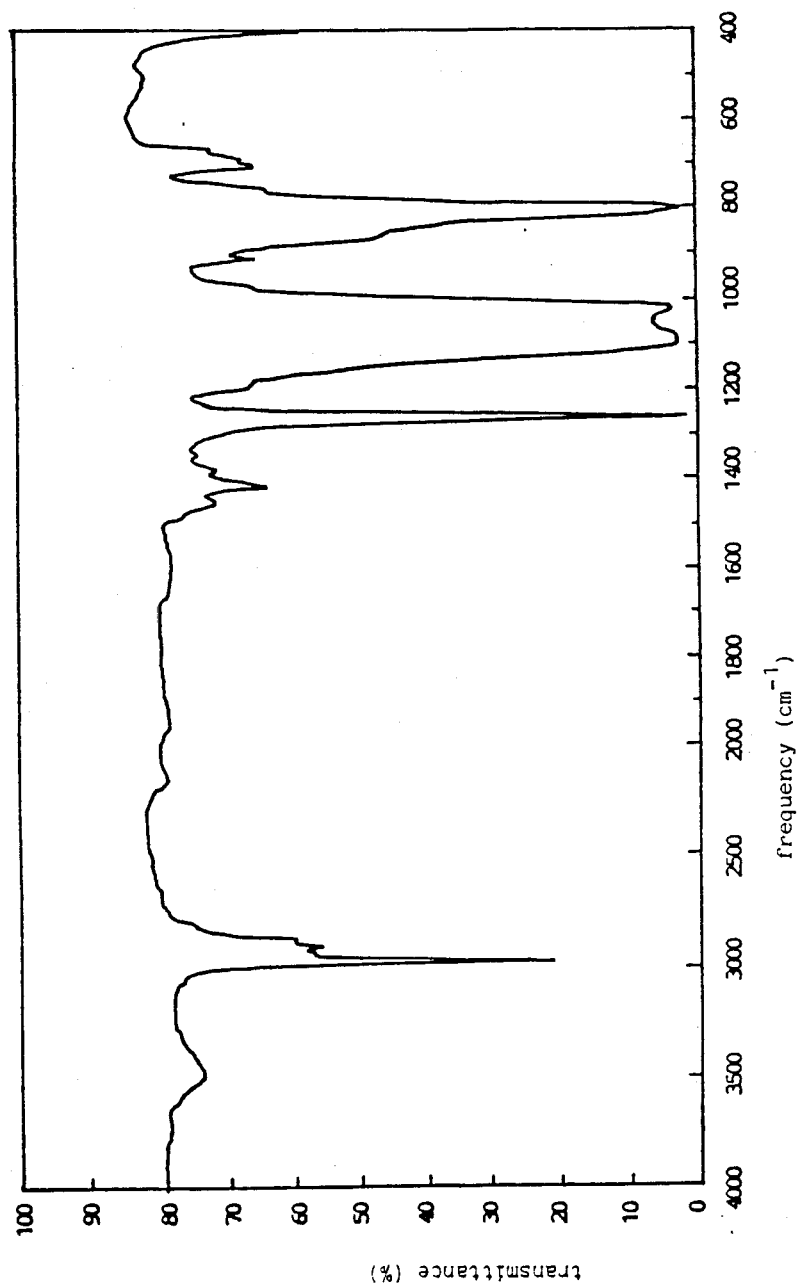
Figure 9:
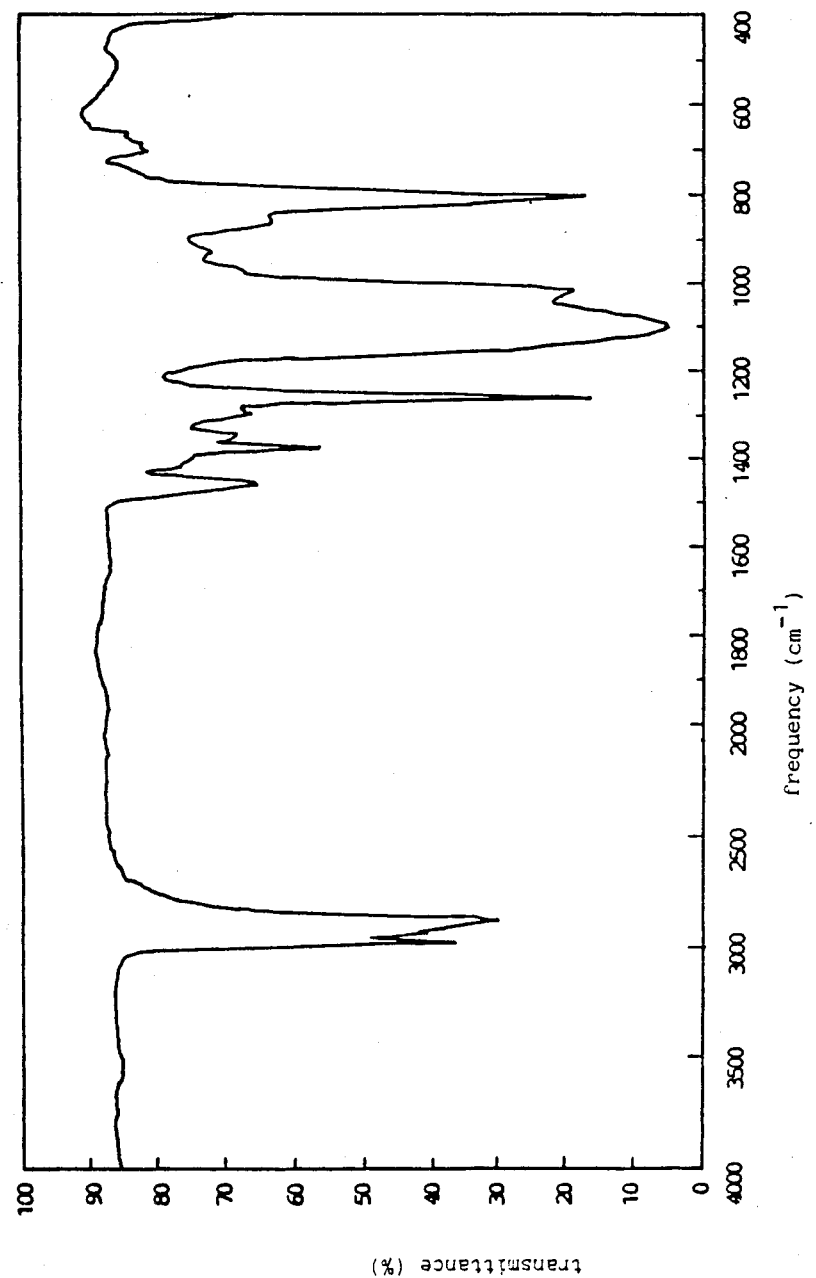

FIGS. 1, 3, 5, 7 and 9 show the results for the infrared absorption spectral analyses of the products produced in Examples 1, 2, 3, 4, and 5, respectively.

Figure 2:
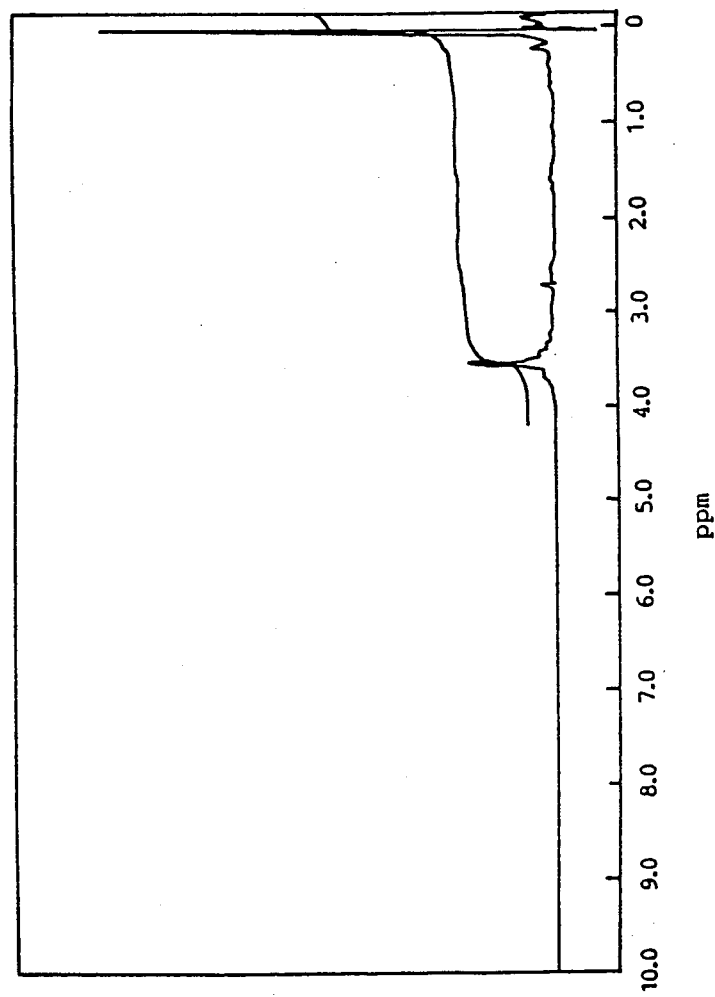
Figure 4:
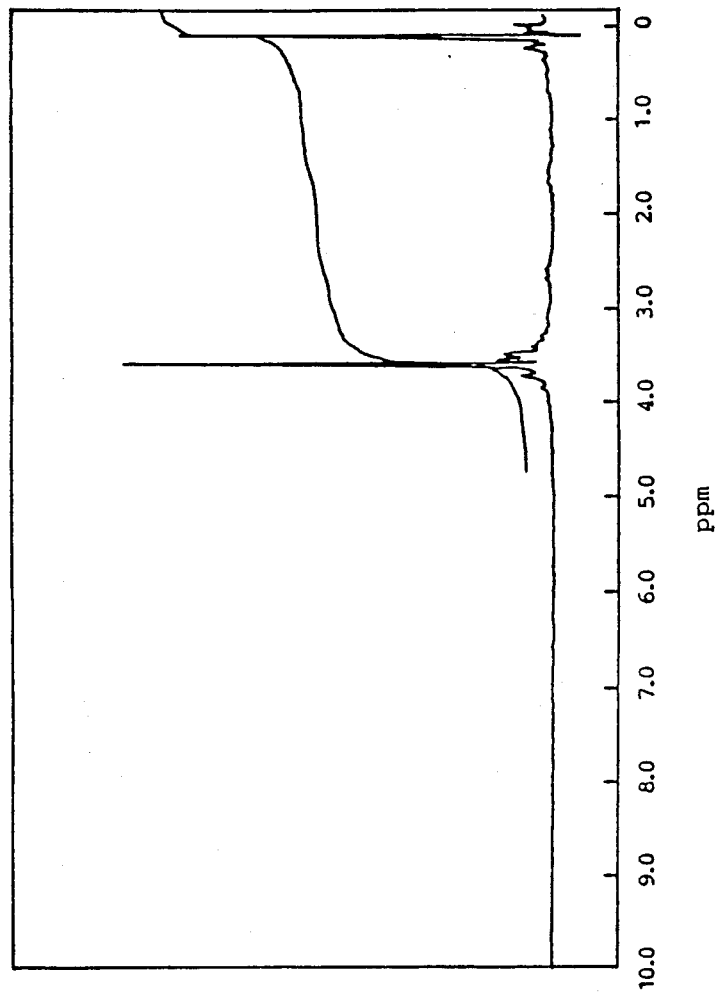
Figure 6:
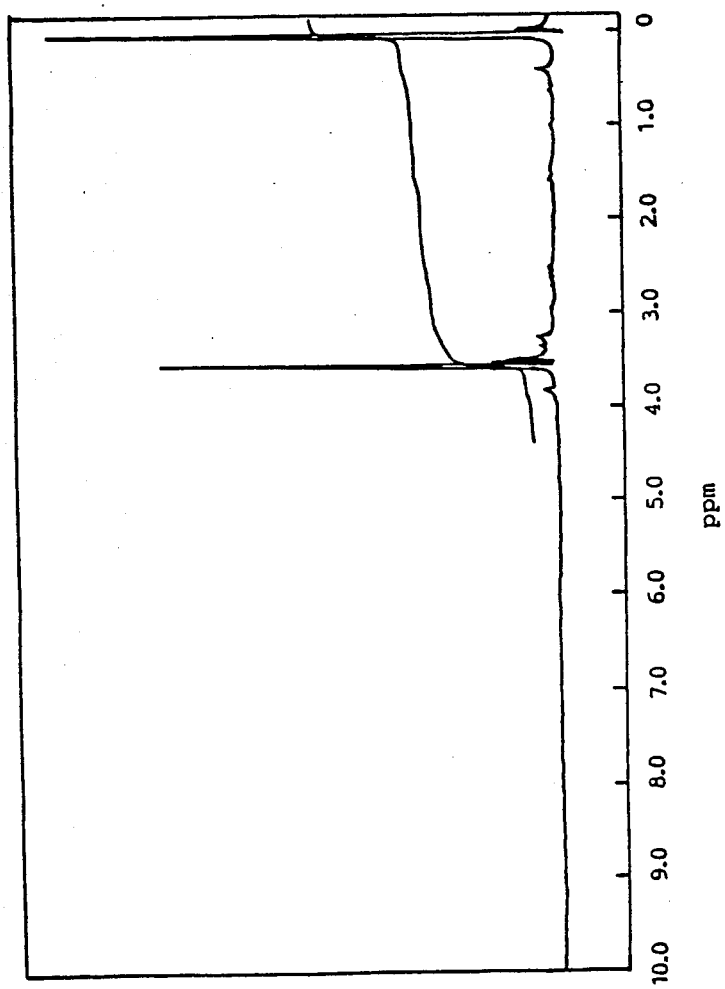
Figure 8:
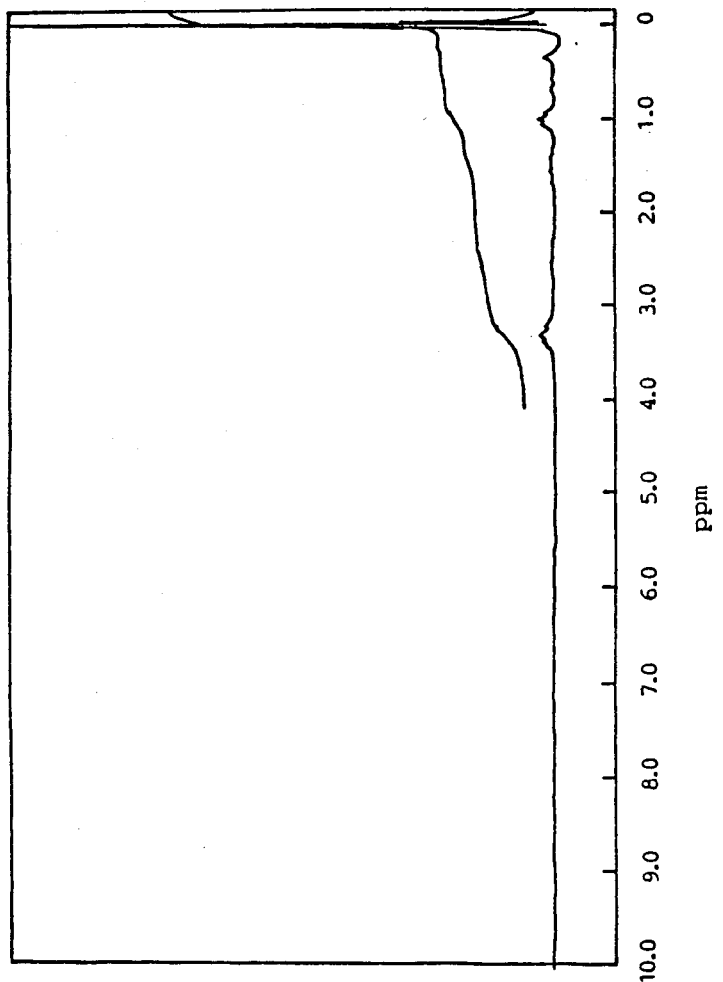
Figure 10:
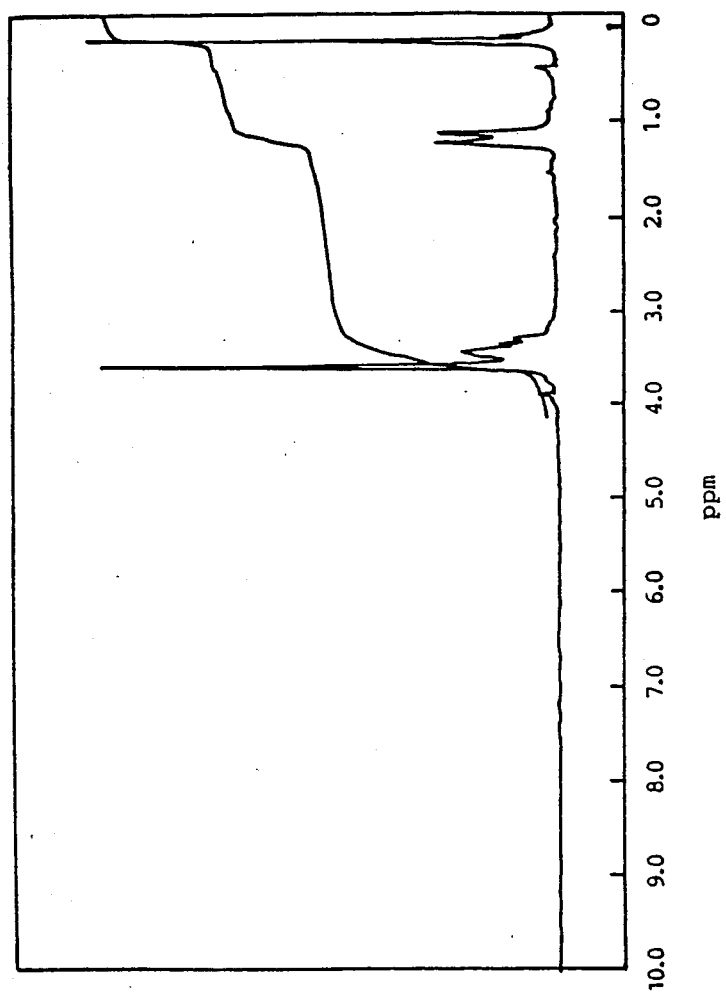

FIGS. 2, 4, 6, 8, and 10 show the results for the nuclear magnetic resonance spectral analyses of the products produced in Examples 1, 2, 3, 4 and 5, respectively.

That which is claimed is:

1. An organopolysiloxane compound having the formula

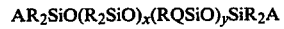
$AR_2SiO(R_2SiO)_x(RQSiO)_ySiR_2A$ wherein R is a monovalent hydrocarbon or halogenated hydrocarbon group having from 1 to 10 carbon atoms, A is R or Q, Q is a group with the formula

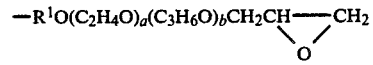
$-R^1O(C_2H_4O)_a(C_3H_6O)_bCH_2CH{-}CH_2$
                                     \ /
                                      O $R^1$ is an alkylene group having from 3 to 5 carbon atoms, a has an average value of 0 to 30, b has an average value of 0 to 30, a+b has an average value of 2 to 60, x has an average value of 1 to 500, y has an average value of 0 to 100, and containing at least one Q group in each molecule.

2. An organopolysiloxane compound in accordance with claim 1 wherein R is methyl.

3. An organopolysiloxane compound in accordance with claim 2 wherein both A groups are methyl and y has a value of at least 1.

4. An organopolysiloxane compound in accordance with claim 2 wherein both A groups are Q groups.

5. An organopolysiloxane compound in accordance with claim 4 wherein y has a value of at least 1.

6. An organopolysiloxane compound in accordance with claim 1 wherein a+b has an average value of at least 3.

* * * * *